United States Patent [19]

Pellegrini, Jr. et al.

[11] 4,136,042

[45] Jan. 23, 1979

[54] LUBRICATING OILS CONTAINING DITHIOPHOSPHORYLATED COPOLYMERS OF AZIRIDINEETHYL ACRYLATES OR METHACRYLATES AND ALKYL ACRYLATES OR METHACRYLATES

[75] Inventors: John P. Pellegrini, Jr., Pittsburgh; Helen I. Thayer, Oakmont, both of Pa.

[73] Assignee: Gulf Research & Development Company, Pittsburgh, Pa.

[21] Appl. No.: 843,315

[22] Filed: Oct. 18, 1977

[51] Int. Cl.$^2$ .................. C10M 1/48; C10M 3/42; C10M 5/24; C10M 7/46
[52] U.S. Cl. ................................................ 252/46.7
[58] Field of Search .................. 252/46.7; 44/62, 72

[56] References Cited

U.S. PATENT DOCUMENTS

| 3,864,099 | 2/1975 | Elk | 252/51.5 A |
|---|---|---|---|
| 3,865,740 | 2/1975 | Goldschmidt | 252/46.7 |
| 4,026,812 | 5/1977 | Le Suer | 252/46.7 |
| 4,032,461 | 6/1977 | Hoke | 252/46.7 |
| 4,042,523 | 8/1977 | Brois | 252/46.7 |

*Primary Examiner*—Irving Vaughn

[57] ABSTRACT

Lubricating oils comprising mineral oils and synthetic oils having high pour points are provided with one or more enhanced characteristics such as improved pour point, viscosity, viscosity index, metal-free and anti-wear properties by the addition of a dialkyl, diaryl, dialkaryl, diarylalkyl; or diaryloxyalkyl dithiophosphate copolymer of (A) a monomeric aziridineethyl acrylate or methacrylate and (B) a monomeric alkyl acrylate or alkyl methacrylate.

18 Claims, No Drawings

LUBRICATING OILS CONTAINING DITHIOPHOSPHORYLATED COPOLYMERS OF AZIRIDINEETHYL ACRYLATES OR METHACRYLATES AND ALKYL ACRYLATES OR METHACRYLATES

BACKGROUND OF THE INVENTION

1. Field of Invention

This invention relates to lubricating oil compositions comprising fuel oils, crude oils, mineral oils and synthetic oils having one or more improved characteristics, such as pour point, viscosity, viscosity index, metal-free and anti-wear properties.

Crude, refined and synthetic lubricating oils frequently require modification or the addition of additives to improve one or more of their physical characteristics such as pour point, viscosity, viscosity index, metal-free and anti-wear characteristics. In particular, one or more of the above-described properties is imparted to lubricating oil compositions by the addition of a dialkyl, diaryl, dialkaryl, diarylalkyl or diaryloxyalkyl dithiophosphorylated copolymer of (A) a monomeric aziridineethyl acrylate or methacrylate (B) a monomeric alkyl acrylate or alkyl methacrylate. The copending application of Pellegrini et al, entitled Dithiophosphorylated Copolymers of Aziridineethyl Acrylates or Methacrylates and Alkyl Acrylates or Methacrylates, Ser. No. 843,331, filed Oct. 18, 1977, describes in detail how to prepare these compounds.

2. Description of the Prior Art

The monomeric aziridineethyl acrylic and methacrylic esters and the monomeric alkyl esters of acrylic and methacrylic acid from which the copolymers are prepared are known. For example, the preparation of copolymers of aziridineethyl acrylates or methacrylates/alkyl acrylates or methacrylates and their use in crude oils, mineral oils and fuel oils are described in U.S. Pat. No. 3,864,099, issued to Ek, on Feb. 4, 1975. In particular, monomeric $C_8$–$C_{18}$ alkyl esters of acrylic or methacrylic acid are described as particularly suitable for comprising of aziridineethyl acrylates or methacrylates using conventional techniques in the art. These compounds are described as enhancing one or more physical characteristics of the above oils when added thereto. U.S. Pat. No. 3,865,740, issued to Goldschmidt, on Feb. 11, 1975, describes certain alkyl, aryl, alkaryl or arylalkyl O,O-diesters of dithiophosphoric acid which may serve as extreme pressure agents, antioxidants and ashless dispersants for lubrication oil compositions. Similarly dithiophosphoric acid esters and their derivatives are known and described for example, in U.S. Pat. No. 3,826,745, issued to Ryer et al, on July 30, 1974 which teaches dithiophosphoric acid ester derivatives in combination with amine salts of mixed acid phosphates as anti-wear, corrosion inhibitors and anti-oxidant additives for lubricating oils. These dithiophosphates are additionally described as suitable for use in various types of lubricating oil compositions, including animal and vegetable oil compositions as well as mineral and synthetic lubricating oils.

SUMMARY OF THE INVENTION

This invention relates to a lubricating oil composition which comprises a major amount of a lubricating oil selected from the group of fuel oils, crude oils, mineral oils or synthetic oils and a minor amount of an oil soluble dialkyl, diaryl, dialkaryl, diarylalkyl or diaryloxyalkyl dithiophosphorylated copolymer of (A) a monomeric aziridineethyl α-substituted acrylate or methacrylate having the formula:

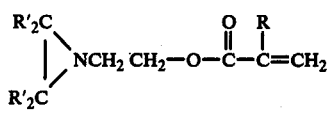

wherein R is selected from the group consisting of hydrogen and alkyl having from about 1 to about 6 carbon atoms, preferably from about 1 to about 3 carbon atoms; and each R' is either alike or different, selected from hydrogen and lower alkyl groups of from about 1 to about 8 carbon atoms, preferably from about 1 to about 4 carbon atoms; and (B) a monomeric alkyl acrylate or methacrylate of the formula:

wherein R" is selected from the group of hydrogen and methyl, and R''' is selected from straight and branched chain alkyl groups containing from about 1 to about 30 carbon atoms; preferably from about 1 to about 20 carbon atoms; with the mole ratio of A to B being in the range of about 1:99 to about 30:60, preferably from about 1:99 to about 10:90, said copolymer comprising the formula:

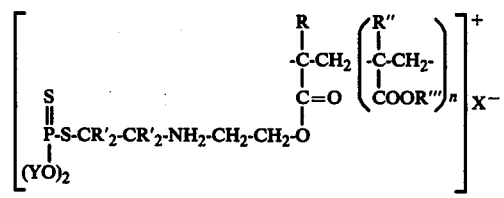

wherein R, R', R" and R''' are as described above; Y is alkyl, aryl, alkaryl, arylalkyl or aryloxyalkyl having from about 1 to about 30 carbon atoms; preferably from about 1 to about 20 carbon atoms; $X^-$ is

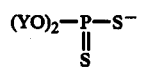

wherein Y is defined above, and wherein n is an integer of from about 1 to about 300, preferably from about 2 to about 99; said copolymer having a molecular weight of at least about 20,000 especially from about 20,000 to about 300,000, preferably from about 100,000 to about 200,000; with at least from about 0.1 weight percent to about 60 weight percent, preferably from about 1.0 weight percent to about 30 weight percent, comprising the dialkyl, diaryl, dialkaryl, diarylalkyl; or diaryloxyalkyl dithiophosphate moiety.

DETAILED DESCRIPTION OF THE INVENTION

The present invention resides in lubrication oil compositions comprising an oil of lubricating viscosity and dialkyl, diaryl, dialkaryl, diarylalkyl or diaryloxyalkyl dithiophosphorylated copolymers of aziridineethyl acrylates or methacrylates and alkyl acrylates or methacrylates which are particularly suitable for use as metal-free, anti-wear additives when incorporated in lubrication oil compositions.

The aziridineethyl acrylate or methacrylate monomers and alkyl acrylate or methacrylate monomers of the present invention are conveniently prepared from the corresponding acrylic or methacrylic acids. These acids can be synthesized using conventional methods and techniques. For example, acrylic acid is prepared by the acidic hydrolysis and dehydration of ethylene cyanohydrin or by the polymerization of β-propiolactone and the destructive distillation of the polymer to form acrylic acid.

Methacrylic acid is readily prepared by the oxidation of methyl α-alkyl vinyl ketone with metal hypochlorites; the dehydration of α-hydroxyisobutyric acid with phosphorus pentoxide; or by the hydrolysis of acetone cyanohydrin.

Suitable aziridineethyl acrylate or methacrylate monomers are prepared by an ester interchange reaction between an ester of an ethylenically unsaturated monocarboxylic acid such as acrylic or methacrylic acid and a (1-aziridinyl) alkanol compound, or a (1-aziridinyl) alkanol compound in which at least one carbon atom of the aziridinyl group is substituted. Illustrative examples of suitable aziridinyl alcohols used to prepare the esters utilized in the present invention include 2-(1-aziridinyl) ethanol, 2-(2-methyl-1-aziridinyl) ethanol, 2-(2-dimethyl-1-aziridinyl)ethanol, 2-(2-ethyl-1-aziridinyl) ethanol, 2-(1-aziridinyl)-1-propanol, 2-(2,3,-dimethyl-1-aziridinyl)-1-butanol, 2(2,2-dimethyl-1-aziridinyl)-1-butanol, 2(2,2-diethyl-aziridinyl)-1-ethanol, 2-(2-n-butyl-1-aziridinyl)-1-ethanol, 1-(2-methyl-3-ethyl-1-aziridinyl)-2-butanol or 1-(1-aziridinyl)-2-hexanol.

The alkyl acrylate or methacrylate monomers of the present invention are conveniently prepared by reacting the desired primary alcohol with the acrylic acid or methacrylic acid in a conventional esterification. Suitable alkyl acrylates or alkyl methacrylates contain from about 1 to about 30 carbon atoms in the alkyl carbon chain. Typical examples of starting alcohols include methyl alcohol, ethyl alcohol, propyl alcohol, isopropyl alcohol, butyl alcohol, isobutyl alcohol, sec-butyl alcohol, t-butyl alcohol, 2-ethylhexyl alcohol, octyl alcohol, Oxo-octyl alcohol, isodecyl alcohol, undecyl alcohol, dodecyl alcohol, tridecyl alcohol, capryl alcohol, lauryl alcohol, myristyl alcohol, pentadecyl alcohol, palmityl alcohol or stearyl alcohol. It is to be noted that all of the starting alcohols described above can be reacted with acrylic acid or methacrylic acid to form desirable acrylates or methacrylates.

The copolymers useful in the practice of this invention can be prepared in a conventional manner by bulk, solution or dispersant polymerization methods using known catalysts. Thus, the copolymers utilized by this invention can be prepared from the corresponding monomers with a diluent such as water in a heterogeneous system, usually referred to as emulsion or suspension polymerization, or in a homogeneous system with a solvent such as toluene, benzene, ethylene dichloride, which is normally referred to as solution polymerization. Solution polymerization in benzene, toluene or a solvent having similar chain transfer activity is the preferred method used in forming the copolymers disclosed herein, because this method and solvent produce preferred copolymers characterized by a relatively high molecular weight. Solvents normally comprise from about 50 to about 90 weight percent based on the weight of the copolymer.

Copolymerization of the monomers used herein readily takes place under the influence of heat, light and/or catalysts. Suitable catalysts include peroxide-type free radical catalysts such as benzoyl peroxide, lauroyl peroxide, or t-butylhydroperoxide; and free radical catalysts such as α,α-azodiisobutyronitrile. The catalysts, when used, are employed in concentrations ranging from a few hundreds percent to two percent by weight of the monomers. The preferred concentration is from about 0.2 to about 1.0 percent by weight of the monomers.

Copolymerization of the monomers used herein takes place over a wide temperature range depending upon the particular monomers and catalyst utilized in the reaction. For example, copolymerization can take place at temperatures as low as −103° F. (−75° C.) or lower when metallic sodium in liquid ammonia is used as the catalyst. However, the copolymerization reaction is generally carried out at temperatures ranging from about 77° F. (25° C.) to about 302° F. (150° C.) when a catalyst such as α,α-azodiisobutyronitrile is used. The copolymerization reaction is preferably carried out in an inert atmosphere, for example, argon or nitrogen to favor the formation of copolymers having relatively high viscosities and molecular weights.

Preferably, the copolymerization reaction is carried out to substantial completion so that the finished product is essentially comprised of the ratio of monomers introduced into the vessel. Normally, a reaction time of from about 1 to about 72 hours, preferably from about 1 to about 50 hours, is sufficient to complete the copolymerization process.

The copolymers disclosed herein have an average molecular weight of greater than about 20,000, especially a molecular weight range of from about 20,000 to about 300,000, preferably from about 100,000 to about 200,000. The molecular weight of the copolymer can conveniently be determined using conventional techniques.

Specific examples of copolymers which can be used according to the invention are the 1:2, 1:4, 1:9, and 1:18 to 1:99 mole ratio copolymers of (A) monomeric aziridineethyl acrylate or methacrylate and (B) monomeric lauryl acrylate or methacrylate. Examples of other copolymers which can be used in compositions of the invention are the 1:4, 1:9, and 1:19 to 1:99 mole ratio copolymer of (A) monomeric aziridineethyl acrylate or methacrylate and (B) monomeric n-octyl, Oxo-octyl, 2-ethylhexyl, isodecyl, undecyl, tridecyl, capryl, lauryl, myristyl, palmityl and stearyl acrylates and methacrylates.

The third component of the copolymers suitable for use herein comprises the dialkyl, diaryl, dialkaryl, diarylalkyl, or diaryloxyalkyl dithiophosphates which have the general formula:

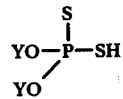

wherein Y is selected from alkyl, aryl, alkaryl, arylalkyl and aryloxyalkyl groups having from about 1 to about 30 carbon atoms, preferably from about 1 to about 20 carbon atoms. The dialkyl, diaryl, dialkaryl, diarylalkyl or diaryloxyalkyl dithiophosphates can be obtained from commercial sources or can be prepared by known conventional methods. For example dialkyl, diaryl, dialkaryl, diarylalkyl or diaryloxyalkyl dithiophosphates can be prepared by reacting phosphorus pentasulfide with an aliphatic alcohol, phenol, alkyl substituted phenol, arylalkanol or aryloxyalkanol containing the desired range of hydrocarbyl groups.

The aliphatic alcohol, phenol, alkyl substituted phenol, arylalkanol or, aryloxyalkanol is normally reacted in a molar ratio of approximately 4 moles of alcohol for each mole of phosphorus pentasulfide to form the corresponding dialkyl, diaryl, dialkaryl, diarylalkyl, or diaryloxyalkyl dithiophosphate.

The dithiophosphates of the present invention are conveniently prepared by mixing the desired alcohol with phosphorus pentasulfide and a solvent such as benzene or toluene in a container such as a glass flask equipped with stirrer, thermometer and reflux condenser and raising the temperature from about 122° F. (50° C.) to about 302° F. (150° C.) under reflux and with stirring for 2 to about 24 hours. The dithiophosphate is next cooled and filtered using conventional methods. Suitable dialkyl, diaryl, dialkaryl, diarylalkanol or diaryloxyethanol, starting alcohols include isopropanol, butanol, 2-ethylhexanol, Oxo-octanol, tridecanol, tetradecanol, hexadecanol, cyclohexanol, methylcylohexanol, phenol, cresol, butylphenol, dioctylphenol, dinonylphenol, didecylphenol, phenylethanol, phenylcarbinol, cresoxyethanol or cresoxypropanol.

The dialkyl, diaryl, dialkaryl, diarylalkyl or diaryloxyalkyl dithiophosphates used herein are sufficiently strong acidic materials to be corrosive to metals and may cause minor irritation if allowed to come into contact with the human skin. Therefore, special care should be exercised in the handling and storage of these compounds. The dithiophosphoric acid diesters herein are usually manufactured in stainless steel, glass lined steel, or Pyrex shatter proof glass containers and it is standard practice to store them in stainless steel storage bins.

In preparing the novel compounds of the present invention a dialkyl, diaryl, dialkaryl, diarylalkyl or diaryloxyalkyl dithiophosphate substantially as herein described, is reacted with an aziridineethyl acrylate or methacrylate/alkyl acrylate or alkyl methacrylate copolymer to form the dithiophosphate derivative thereof. In particular, sufficient dialkyl, diaryl, dialkaryl, diarylalkyl or diaryloxyalkyl dithiophosphate is added to a copolymer of aziridineethyl acrylate or methacrylate and alkyl acrylate or methacrylate to comprise from about 0.1 weight percent to about 60 weight percent of the resulting product, especially about 10 weight percent to about 30 weight percent.

The reaction is preferably conducted in an inert atmosphere such as nitrogen or argon and at a temperature of from about 20° C. to about 100° C. for a period sufficient to react all of the acid with the copolymer. In particular, the acid and copolymer are introduced into a container having an inert atmosphere and reflux condenser and is heated for about 1 to about 48 hours. Although it is not desired to be bound by any theory it is believed that the dithiophosphate moiety attacks the aziridineethyl ring structure and forms a dithiophosphate ester of the copolymer.

The dithiophosphorylated copolymers described herein can be incorporated in a wide variety of lubricating oils, for example mineral oils, crude oils, distillate fuel oils, and synthetic oils. The dithiophosphorylated copolymers can be added to lubricating oils that have been derived from paraffinic, naphthenic or mixed base crude petroleum oils, and that have been subjected to solvent and/or sulfuric-acid treatment, aluminum chloride treatment, hydrogenation and/or other refining treatments. Also, the dithiophosphorylated copolymers described herein can be incorporated in petroleum distillates, such as for example, diesel fuels, jet fuels, furnace oils, heater oil fractions, kerosene, gas oils and other light oils. The fuel oil may be of virgin or cracked petroleum stock, or mixtures thereof, boiling in the range of about 300° F. (148.9° C.) to about 705° F. (398.9° C.) and preferably in the range of about 350° F. (176.7° C.) to about 650° F. (343.3° C.). The fuel oil may contain cracked components, such as for example, those derived from cycle oils or cycle oil cuts boiling above gasoline, usually in the range of about 450° F. (232.2° C.) to about 750° F. (398.9° C.) and may be derived by catalytic or thermal cracking. Oils of high or low sulfur content such as diesel oils may be used.

Preferred distillate fuel oils which are improved in accordance with the invention have an initial boiling point within the range of about 350° F. (176.7° C.) to about 475° F. (246.1° C.) and end point in the range of about 500° F. (260° C.) to about 650° F. (343.3° C.), an API gravity of at least about 30 and a flash point (P-M) not lower than about 110° F. (43.3° C.).

The herein described dithiophosphorylated copolymers can be incorporated in the lubrication oils in any convenient way. Thus, the dithiophosphorylated copolymers can be added directly to the oil by dissolving the desired dithiophosphorylated copolymer in the lubricating oil at the desired level of concentration. Normally, the dithiophosphorylated copolymer is blended with the lubricating oil from about 0.1 to about 10 percent by weight, preferably from about 0.5 to about 5 percent by weight of the oil composition. Alternatively, the dithiophosphorylated copolymer may be blended with suitable solvents to form concentrates that can be readily dissolved in the appropriate oil at the desired concentration. If a concentrate is employed, it ordinarily will contain at least 10 to about 65 percent by weight of the dithiophosphorylated copolymer and preferably about 25 to about 65 percent by weight of the dithiophosphorylated copolymer. The solvent in such a concentrate may be present in amounts of about 35 to about 75 percent by weight. When the concentrate is added to a fuel oil, the solvent preferably boils within the range of about 100° F. (37.8° C.) to about 700° F. (371.1° C.). Suitable solvents which can be used for this purpose are naphtha, kerosene, benzene, xylene, toluene, hexane, light mineral oil and mixtures thereof. The particular solvent selected should, of course, be selected so as not to adversely affect the other desired properties of the ultimate oil composition. Thus, the solvent for use in incorporating the copolymer in a fuel oil should preferably burn without leaving a residue and should be non-corrosive with respect to metal, specifically ferrous metals.

Synthetic liquid fuel and oils derived from solid carbonaceous products are conveniently prepared by blending finely ground carbonaceous materials with a solvent to form a slurry. The slurry is then introduced into a reaction vessel containing a conventional hydrogenation catalyst and is reacted under normal hydrogenating pressures and temperatures. After hydrogenation, solids that are present can conveniently be removed from the product stream. The product is next stripped of solvent. The balance of the product stream may be distilled to obtain products of various boiling ranges, for example, hydrocarbons boiling in the gasoline range and hydrocarbons boiling in the lubrication oil range. Some of the products are useful as fuels and oils, the remainder can be further treated by a conventional petroleum process including cracking, hydrocracking, and the like. Synthetic liquid fuel and oils produced from solid carbonaceous products such as coal are primarily aromatic and generally have a boiling range of about 300° F. (149° C.) to about 1400° F. (760° C.), a density of about 0.1 to about 1.1 and a carbon to hydrogen molecular ratio in the range of about 1.3:1 to about 0.66:1. A typical example is a solvent oil obtained from a subbituminous coal, such as Wyoming-Montana coal; comprising a middle oil having a boiling range of from about 375° F. (190.5° C.) to about 675° F. (375° C.). A description of how to prepare synthetic fuel and oil from carbonaceous material is set forth in greater detail in U.S. Pat. No. 3,957,619 issued to Chun et al on May 18, 1976, entitled Process for the Conversion of Carbonaceous Materials, the disclosure of which is incorporated herein by reference.

Alternatively, the synthetic oil can be a nonhydrocarbon oil of lubricating viscosity. Suitable examples include synthetic oils obtained by polymerization of lower molecular weight alkylene oxides, such as propylene oxide and/or ethylene oxide employing alcohol or acid initiators, such as lauryl alcohol or acetic acid. Other typical synthetic oils include esters, for example, di(2-ethylhexyl)-sebacate, tricresylphosphate and silicate esters, such as tetra-(2-ethylhexyl)orthosilicate and hexa(2-ethylbutoxy)-disiloxane.

If desired, the dithiophosphorylaed copolymers described herein can be employed in conjunction with other additives commonly used in petroleum products. Thus, there can be added to the oil compositions of this invention rust and corrosion inhibitors, anti-emulsifying agents, antioxidants, dyes, haze inhibitors, anti-static agents and other detergent dispersant inhibitors, viscosity index improvement agents and pour point reducing agents. Soaps or other thickening agents may be added to the lubricating oil compositions to form compositions having the consistency of a grease. When other additives are employed, it may be desirable, although not necessary, to prepare additive concentrates comprising concentrated solutions of the herein described dithiophosphorylated copolymer together with said other additives whereby the several additives are added simultaneously. Dissolution of the dithiophosphorylated copolymer or additive concentrate into the oil-composition may be facilitated by mixing accompanied with mild heating, but this is not absolutely essential.

Synthetic lubrication oils as defined herein are those oils derived from a product of chemical synthesis or man made oils. Typical examples of such compositions include the polyglycol fluids (i.e. polyalkylene glycol); silicones which consist of a silicone-oxygen polymer chain to which are attached hydrocarbon branches composed of either alkyl or phenyl groups; phosphates; polyphenyl ethers; synthetic hydrocarbons and various esters of organic acids and alcohols.

The polyalkyleneglycol lubrication oils suitable for use herein preferably are derived from the reaction product of the appropriate alkylene oxides. The alkylene moiety of the above compositions have a carbon chain of from about 1 to about 10 carbon atoms, preferably from about 2 to about 7 carbon atoms and a molecular weight within the range of from about 200 to about 2000, especially from about 200 to about 1000, most preferably from about 200 to about 800. Representative examples of suitably polyalkylene glycols include, polyethylene glycol, polypropylene glycol, polyisopropylene glycol, polybutylene glycol and the like.

The name silicone as used herein denotes a polymer of the formula (Rn SiO (4-n)/2)m wherein n is an integer of from about 0 to about 3 and m is 2 or larger). The compound contains a repeating silicone-oxygen backbone and has organic groups R, wherein R is methyl, phenyl, vinyl and the like. The silicones herein have an average molecular weight within the range of from about 400 to about 9000.

The polyphenyl ethers suitable for use herein have from 3 to 7 benzene rings and from 1 to 6 oxygen atoms, with the stated oxygen atoms joining the stated benzene rings in chains as ether linkages. One or more of the stated benzene rings in these polyphenyl ethers may be hydrocarbyl-substituted. The hydrocarbyl substituents, for thermal stability, must be free of $CH_2$ and aliphatic CH so that preferred aliphatic substituents are lower saturated hydrocarbon radicals (1 to 6 carbon atoms) like methyl and tert-butyl, and preferred aromatic substituents are aryl radicals like phenyl and tolyl. In the latter case, the benzene ring supplied in the hydrocarbonyl substituent contributes to the total number of benzene rings in the molecule. Polyphenyl ethers consisting exclusively of chains of from 3 to 7 benzene rings with at least one oxygen atom joining the stated benzene rings in the chains as an ether linkage have particularly desirable thermal stability.

Exemplary of the alkyl polyphenyl ethers suitable for use are 3-ring polyphenyl ethers like 1-(p-methylphenoxy)-4 phenoxybenzene and 2,4-diphenoxy-1-methyl-benzene, 4 ring polyethers like bis[p-(p-methylphenoxy)phenyl] ether and bis [(p-tert-butylphenoxy)-phenyl] ether, and the like.

Polyphenyl ethers consisting exclusively of benzene rings and ether oxygen atoms linking said rings are exemplified by the triphenoxy benzenes and aryl-substituted polyphenyl ethers such as biphenyl phenoxyphenyl ether, biphenylyloxyphenyl phenoxyphenyl, ether, biphenylyl ether, dibiphenylyloxybenzene, bis(-phenylyloxyphenyl) ether, and the like.

A preferred class of polyphenyl ethers comprises those consisting of benzene rings joined in a chain by oxygen atoms as ether linkages between each ring. Examples of the polyphenyl ethers contemplated in the class are the bis(phenoxyphenyl) ethers (4 benzene rings joined in a chain by 3 oxygen atoms), illustrative of which is bis(m-phenoxyphenyl) ether. The bis(phenoxyphenoxy) benzenes are particularly valuable in the present invention. Illustrative of these are m-bis (m-phenoxy-phenoxy) benzene, m-bis(p-phenoxy-phenoxy) benzene, o-bis(o-phenoxy-phenoxy) benzene, and so forth. Further, the polyphenyl ethers contemplated herein include the bis(phenoxyphenoxy-phenyl) ethers such as bis[m-(m-phenoxyphenoxy) phenyl] ether, bis[p-(p-phenoxyphenoxy)phenyl] ether, m-(m-phenoxyphenoxy)phenyl m-(o-phenoxyphenoxy) phenyl ether and the bis (phenoxyphenoxyphenoxy) benzenes such as m-bis[m-phenoxyphenoxy) phenoxy] benzene, p-bis[p-(m-phenoxyphenoxy)phenoxy] benzene and m-bis[m-(p-phenoxyphenoxy)phenoxy] benzene.

Synthetic lubricating oils derived from hydrocarbons are generally of two types, namely, dialkylated benzene and polymerized alpha-olefins. Dialkylated benzene herein is formed from the condensation product of the appropriate alkyl compound and has a carbon chain from about 5 to about 50 carbon atoms, preferably from about 8 to about 20 carbon atoms; and a molecular weight of from about 200 to about 1500, preferably from about 300 to about 700. Representative compounds include di-n-decylbenzene, n-decyl-n-tetradecylbenzene, and t-nonyl-t-dodecylbenzene.

Alpha-Olefins suitable for use in preparing lubricating oils herein are characterized by the formula RCH=CH$_2$, wherein R is a radical selected from the group of hydrogen and alkyl radicals having from about 4 to about 18 carbon atoms, preferably from about 6 to about 10 carbon atoms, and having a molecular weight of from about 80 to about 300, preferably from about 100 to about 200. Typical compounds include 1-octene, 1-decene and 1-dodecene.

Phosphates suitable for use herein as synthetic lubricating oils are the phosphate esters having the formula O=P(OR)$_3$, wherein R is aryl or alkyl having from about 4 to about 20 carbon atoms, preferably from 6 to about 10 carbon atoms, and have a molecular weight within the range of from about 200 to about 1,000, preferably from about 300 to about 550. Representative compounds include trioctyl phosphate, tricresyl phosphate and dicresyl methyl phosphate.

Esters of organic acids which are suitable for use herein as synthetic lubrication oils preferably are selected from organic acids having carbon chains of from C$_4$ to C$_{10}$ carbon units. Organic acids which can be reacted with the alcohols herein include caproic, decanoic, sebacic etc. Likewise alcohols herein can be derived from either natural or synthetic origin for example pentaerythritol, trimethylolpropane, amyl or 2-ethylhexanol can be used to form the desired ester. The esters are formed using conventional methods. For example, the esters may be prepared by reaction of the desired alcohol with the desired acid anhydride or acid halide under reaction conditions.

It is to be noted that the following Examples are representative of the best mode of how to practice the invention herein described and are not intended to limit the scope thereof.

EXAMPLE I

A light neutral mineral oil (as defined in Example VI) having enhanced pour point, viscosity, viscosity index, metal-free and anti-wear properties is prepared by blending a 2.5:97.5 mole ratio of dibutyl dithiophosphate, aziridineethyl methacrylate/isodecyl methacrylate copolymer with the mineral oil.

The copolymer was prepared by charging a 3 liter flask, equipped with a reflux condenser, thermometer and mechanical stirrer, with 450.0 grams of light neutral mineral oil, 220.7 grams of isodecyl methacrylate and 4.22 grams of aziridineethyl methacrylate and 1.6 grams of α,α'-azodiisobutyronitrile. The system was flushed with nitrogen for ½ hour and the mixture was heated at 55° C. for 10 hours.

The copolymer was dithiophosphorylated by charging 45.0 grams of the copolymer, 90 grams of light neutral mineral oil and 2.610 grams of dibutyl dithiophosphoric acid to a 500 ml flask equipped with mechanical stirrer, thermometer and a standard reflux condenser. The system was next flushed with nitrogen and the mixture heated with stirring for 5 hours at 176° F. (80° C.).

The resulting dithiophosphorylated copolymer was blended with a light neutral mineral oil (as defined in Example VI) at a concentration of 3% by weight. The light neutral mineral oil was analyzed before and after addition of the dithiophosphorylated copolymer. The results are tabulated below:

Table I

| Component | Viscosity | | Viscosity Index | Pour Point |
|---|---|---|---|---|
| | 100° F | 210°F | | |
| Light Neutral Mineral Oil | 22.47 | 4.25 | 101 | −5 |
| Light Neutral Mineral Oil + 3% dithiophosphorylated copolymer | 49.93 | 9.67 | 196 | −10 |

The dibutyl dithiophosphate, aziridineethyl methacrylate/isodecyl methacrylate copolymer (2.5:97.5 mole ratio) above is especially suited for use as metal-free, anti-wear agents when formulated with engine lubricating compositions. As can be determined from the above, the viscosity, viscosity index and pour point are additionally enhanced by the addition of the copolymer herein. It is to be noted that substantially the same results are obtained when the dialkyl, diaryl, dialkaryl, diarylalkyl, or diaryloxyalkyl dithiophosphorylated aziridineethyl acrylate or methacrylate/alkyl acrylate or alkyl methacrylate copolymers, substantially as described herein ar substituted for the dibutyl dithiophosphate, aziridineethyl methacrylate/isodecyl methacrylate above.

EXAMPLE II

A lubricating oil having improved anti-wear and metalfree characteristics, as well as, improved viscosity, viscosity index and pour point properties was formulated by preparing a 1:19 mole ratio of dibutyl dithiophosphoric acid, aziridineethyl methacrylate/lauryl methacrylate copolymer by combining 10.0 grams of dibutyl dithiophosphate and 3.38 grams of aziridineethyl methacrylate and 100 ml of dry benzene. The procedure of Example I was followed with the following exceptions. The mixture was heated and stirred at 80° C. for 3 hours under a nitrogen atmosphere. The solvent (benzene) was removed by distillation and the resulting product was added to 96.5 grams of lauryl methacrylate in 200 grams of light neutral mineral oil which contained 0.66 gram of α,α-azodiisobutyronitrile. This solution was heated at 65° C. for 12 hours.

A lubricating oil blend was prepared by mixing 3% by weight of the resulting copolymer with a light neutral mineral oil (as defined in Example VI). An analysis of the oil before and after addition of the copolymer gave the results tabulated below:

Table II

| Component | Viscosity | | Viscosity Index | Pour Point (° F) |
|---|---|---|---|---|
| | 100° F | 210° F | | |
| Light Neutral Mineral Oil | 22.47 | 4.25 | 101 | −5 |
| Light Neutral Mineral oil + 3% dithiophosphorylated copolymer | 43.37 | 8.28 | 182 | −55 |
| Light Neutral Mineral oil + 3% dithiophosphorylated | 49.95 | 9.84 | 201 | −50 |

Table II-continued

| Component | Viscosity | Viscosity Index | Pour Point (° F) |
|---|---|---|---|
| copolymer* | | | |

*The order of addition in forming the dithiophosphorylated copolymer above was varied by reacting the aziridineethyl methacrylate with the lauryl methacrylate to form the 1:19 mole ratio copolymer and then reacting the appropriate weight of dibutyl dithiophosphoric acid with the resulting copolymer. In both instances, the viscosity, viscosity index and pour point of the lubrication oil was enhanced. Additionally the anti-wear and metal-free properties of the oil composition are improved. When the other dithiophosphorylated copolymers described herein are substituted for the dibutyl dithiophosphate, aziridineethyl methacrylate, lauryl methacrylate copolymer above, substantially the same results are obtained.

EXAMPLE III

A No. 2 fuel oil and residual fuel composition having enhanced metal-free and pour point depressant properties was prepared by adding 0.3 percent by weight and 0.03 percent by weight of dibutyl dithiophosphate, aziridineethyl methacrylate/lauryl methacrylate copolymer (1:19 mole ratio containing 2 moles of dibutyl dithiophosphate) to the oil composition as follows.

A control consisting of No. 2 heating oil was tested to determine its pour point using the method set-forth in ASTM: D-97. The control had a pour point of 5° F. (−15° C.). A second sample was prepared by adding 0.3 percent by weight of the above copolymer to the No. 2 heating oil. Analysis indicated that the pour point of the oil was −25° F. (−32° C.). When 0.03 percent by weight of the copolymer was added to the oil composition the pour point decreased to −10° F. (−23° C.).

EXAMPLE IV

A test was devised to determine the anti-wear characteristics of the copolymers herein using a test engine comprising a 1967 Oldsmobile block (425 CID) with 1970 cylindrical heads. The engine was spray cleaned with solvent before each test, and a new oil filter, weighed rocker arm pivots, and measured camshaft and hydraulic lifters were installed for each test. The cylinder heads were reconditioned every tenth test with installation of new parts. Additionally, the camshaft sprocket was replaced and the distributor checked for condition of points and advance mechanism every tenth test.

Following start up the engine was idled at 850 RPM and the timing set at 5° BTC with the vacuum advance disconnected. The engine was run for 15 hours (or other specified time period) under the following conditions:

Table III

| | |
|---|---|
| Speed | 3000 RPM |
| Load | 100 lb-ft. |
| Coolant outlet | 180° F (82° C) |
| oil to engine after filter | ≈260° F (127° C) | one oil level correction was made after 8 hours of operation and a one-quart sample was retained at the end of the test. The test requires about 80 gallons of fuel and 2 gallons of test oil.

At the end of the test, the camshaft and lifters were inspected visually and measured. The rocker arm pivots were weighed and unless unusual wear was observed the visual rating was not reported.

The test oil consisted of an SAE grade 30 motor oil which contained 3.0% by weight of dibutyl dithiophosphate, aziridineethyl methacrylate/lauryl methacrylate copolymer (5:95 mole ratio containing 2 moles of the dithiophosphate). The results were as follows:

Table IV

| Wear Test | Maximum | Minimum | Average |
|---|---|---|---|
| Combined Camshaft and Lifter Wear (Grams) | 0.0009 | 0.0005 | 0.0007 |
| Rocker Arm Pivot Wear (Grams) | 0.0357 | 0.0197 | 0.0250 |

Most of the lifters observed had a tarnished appearance and traces of the original machine tool marks which are indicative of low wear. It is to be noted that the other copolymers described herein can be substituted for the dibutyl dithiophosphate copolymer above with substantially the same results occurring.

EXAMPLE V

The test procedure of Example IV was followed with the following exceptions. The test oil comprised an SAE grade 10W/40 weight oil which contained 2.5 percent by weight of dibutyl dithiophosphate, aziridineethyl methacrylate/isodecyl methacrylate copolymer (2.5:97.5 mole ratio which contained 2 moles of dibutyl dithiophosphate). The results of the test are tabulated below.

Table V

| Wear Test | Maximum | Minimum | Average |
|---|---|---|---|
| Combined Camshaft and Lifter Wear (Grams) | 0.0008 | 0.0004 | 0.0006 |
| Rocker Arm Pivot Weight Loss (Grams) | 0.0501 | 0.0235 | 0.0368 |

The lifters has a tarnished appearance with traces of the original machine tool marks from manufacturing.

EXAMPLE VI

A semi-synthetic lubricating oil composition having one or more enhanced characteristics such as improved pour point, viscosity, viscosity index, metal-free and anti-wear properties was prepared by mixing a synthetic hydrocarbon oil (4cs) with a light neutral oil and a copolymer as described below. The synthetic hydrocarbon oil utilized herein is marketed commercially by the Gulf Oil Company under the trademark SYN-FLUID® SF-0408-1.

The light neutral mineral oil had the following properties

TABLE VI

| | |
|---|---|
| Gravity, API | 32.9 |
| Specific Gravity, 60/60° F | 0.8607 |
| Viscosity, SUS, 100° F | 102.5 |
| Viscosity, SUS, 210° F | 39.5 |
| Viscosity Index | 96 |
| Pour Point, ° F | +10 |
| Iodine Number | 4.6 |

The synthetic oil used was a hydrocarbon type oil with the following carbon distribution:

| | |
|---|---|
| $C_{20}$ | .09 % |
| $C_{30}$ | 38.61 % |
| $C_{40}$ | 15.23 % |
| $C_{50}$ | 1.08 % |

An analysis of the synthetic hydrocarbon oil gave the following results:

Table VII

| | |
|---|---|
| Specific Gravity, 60/60° F | 0.8179 |
| Viscosity, 100° F (ASTM:D-445) | 18.13 |

Table VII-continued

| | |
|---|---|
| Viscosity, 210° F (ASTM:D-445) | 3.92 |
| Viscosity index (ASTM:D-2270) | 123 |
| Pour Point, ° F (ASTM:D-97) | <−65 |
| Bromine Number | 316 |

A lubricating oil composition was prepared and tested as indicated in Table VIII below.

Table VIII

| | Semi-Synthetic Lubricating Oil | | | | | | |
|---|---|---|---|---|---|---|---|
| Oil Composition | Percent By Volume | | | | | | |
| SYNFLUID® SF-0408-1 (4cs)[1] | 25 | 25 | 25 | 25 | 25 | 25 | 25 |
| Light Neutral Oil | 75 | 75 | 75 | 75 | 75 | 75 | 75 |
| Copolymer Composition | Percent By Weight | | | | | | |
| AZ MA/LMA + DBDTP[2] | — | 3.0 | 1.0 | 0.5 | — | — | — |
| AZ MA/LMA + DDOPDTA[3] | — | — | — | — | 3.0 | 1.5 | 0.5 |
| Inspections | | | | | | | |
| Viscosity (ASTM:D-445) 100° F | 20.09 | 49.66 | 27.75 | 23.66 | 61.24 | 30.06 | 24.40 |
| Viscosity (ASTM:D-445) 210° F | 4.01 | 10.99 | 5.78 | 4.85 | 12.64 | 6.15 | 5.20 |
| Viscosity Index (ASTM:D-2270) | 106 | 235 | 171 | 142 | 223 | 172 | 136 |
| Pour Point (ASTM:D-97) ° F | −10 | −55 | −60 | −55 | −60 | −65 | −60 |

[1]SYNFLUID® SF-0408-1(4cs) = a synthetic hydrocarbon oil marketed commercially by the Gulf Oil Company.
[2]AZ MA/LMA + DBDTP = dibutyl dithiophosphate, aziridineethyl methacrylate/lauryl methacrylate copolymer (mole ratio of 1:19 which contains 2 moles of dibutyl dithiophosphate).
[3]AZ MA/LMA + DDOPDTP = di(dioctylphenyl) dithiophosphate, aziridineethyl methacrylate/lauryl methacrylate copolymer (1:19 mole ratio which contains 2 moles of di(dioctylphenyl) dithiophosphate).

The other copolymers herein can be substituted for the copolymers above with substantially the same results. Additionally, metal-free and anti-wear properties are imparted to the oil composition when the copolymers herein are mixed therewith.

EXAMPLE VII

A synthetic lubricating oil having the enhanced properties of the oil composition in Example VI was prepared from a mixture of the synthetic lubrication oil therein and a synthetic hydrocarbon oil (6cs) having the following carbon distribution:

| | |
|---|---|
| $C_{20}$ | 1.07% |
| $C_{30}$ | 39.03% |
| $C_{40}$ | 42.00% |
| $C_{50}$ | 17.69% |

The synthetic hydrocarbon oil used herein is marketed commercially by the Gulf Oil Company under the tradename SYNFLUID® SF-0603-7. An analysis of the synthetic hydrocarbon oil gave the following results:

Table IX

| | |
|---|---|
| Specific Gravity, 60/60° F | 0.8257 |
| Viscosity, 100° F (ASTM:D-445) | 30.60 |
| Viscosity, 212° F (ASTM:D-445) | 5.64 |
| Viscosity Index (ASTM:D-2270) | 138 |
| Pour Point ° F (ASTM:D-97) | <−65 |
| Bromine Number | 422 |

A synthetic lubricating oil composition was prepared and analyzed as indicated in Table X below.

Table X

| | Synthetic Lubricating oil | | | | | | |
|---|---|---|---|---|---|---|---|
| Oil Composition | Percent By Volume | | | | | | |
| SYNFLUID® SF-0408-1 (4cs)[1] | 41.6 | 41.6 | 41.6 | 41.6 | 41.6 | 41.6 | 41.6 |
| SYNFLUID® SF-0603-7 (6cs)[2] | 58.4 | 58.4 | 58.4 | 58.4 | 58.4 | 58.4 | 58.4 |
| Copolymer Composition | | | | | | | |
| AZ MA/LMA + DBDTP[3] | — | 3.0 | 1.0 | 0.5 | — | — | — |
| AZ MA/LMA + DDOPDTP[4] | — | — | — | — | 3.0 | 1.0 | 0.5 |
| Inspections | | | | | | | |
| Viscosity (ASTM:D-445) 100° F | 24.46 | 47.70 | 31.30 | 28.21 | 60.68 | 34.21 | 29.30 |
| Viscosity (ASTM:D-445) 210° F | 4.83 | 8.67 | 6.58 | 5.72 | 13.07 | 7.05 | 5.89 |
| Viscosity Index (ASTM:D-2270) | 132 | 174 | 185 | 163 | 235 | 188 | 163 |
| Pour Point (ASTM:D-97) ° F | −65 | −65 | <−65 | <−65 | <−65 | <−65 | <−65 |

[1]SYNFLUID® SF-0408-1 (4cs) = a synthetic hydrocarbon oil marketed commercially by the Gulf Oil Company.
[2]SYNFLUID® SF-0603-7 (6cs) = a synthetic hydrocarbon oil marketed commercially by the Gulf Oil Company.
[3]AZ MA/LMA + DBDTP = dibutyl dithiophosphate, aziridineethyl methacrylate/lauryl methacrylate copolymer (mole ratio 1:19 which contains 2 moles of dibutyl dithiophosphate).
[4]AZ MA/LMA + DDOPDTP = di (dioctylphenyl) dithiophosphate, aziridineethyl methacrylate/lauryl methacrylate copolymer (1:19 mole ratio which contains 2 moles of di(dioctylphenyl) dithiophosphate).

The other copolymers herein can be substituted for the copolymers above with substantially the same results. Additionally, metal-free and anti-wear properties are imparted to the oil composition when the copolymers herein are mixed therewith.

EXAMPLE IX

A hydrocarbon-ester type synthetic lubricating oil composition was prepared from an ester mixture of $C_4$-$C_{10}$ acids and technical pentaerythritol. The ester mixture and pentaerythritol used has the formula:

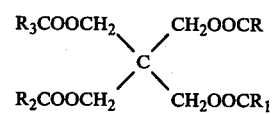

wherein 80 percent of R, $R_1$, $R_2$, and $R_3$ are 8 carbon units or higher. The compound is marketed commercially by Hercules, Inc. under the tradename of Hercolube J ®.

A synthetic lubricating oil composition was prepared having one or more enhanced properties such as improved pour point, viscosity, viscosity index, metal-free and anti-wear properties by blending Hercolube J® and the Synthetic hydrocarbon oil composition (6cs) of Example VIII together in the proportions in Table XI below.

Table XI

| Hydrocarbon-Ester Type Synthetic Oil | | | | | | | |
|---|---|---|---|---|---|---|---|
| Oil Composition | Percent By Volume | | | | | | |
| SYNFLUID® SF-0603-7[1] | 80.0 | 80.0 | 80.0 | 80.0 | 80.0 | 80.0 | 80.0 |
| Hercolube J®[2] | 20.0 | 20.0 | 20.0 | 20.0 | 20.0 | 20.0 | 20.0 |
| Copolymer Composition | | | | | | | |
| AZ MA/LMA + DBDTP[3] | | 9.0 | 3.0 | 1.5 | — | — | — |
| AZ MA/LMA + DDOPDTP[4] | | — | — | — | 9.0 | 3.0 | 1.5 |
| Inspections | | | | | | | |
| Viscosity (ASTM:D-445) 100° F | 27.94 | 65.33 | 38.67 | 33.67 | 82.11 | 42.74 | 35.41 |
| Viscosity (ASTM:D-445) 210° F | 5.29 | 12.81 | 7.35 | 6.35 | 15.68 | 8.13 | 6.67 |
| Viscosity Index (ASTM:D-2270) | 136 | 213 | 171 | 155 | 215 | 180 | 159 |
| Pour Point (ASTM:D-97) ° F | −65 | −65 | −65 | −65 | −65 | −65 | −65 |

[1]SYNFLUID® SF-0603-7 (6cs) = a synthetic hydrocarbon oil marketed commercially by the Gulf Oil Company.
[2]Hercolube J® = a hydrocarbon-ester type synthetic lubricating oil marketed commercially by Hercules, Inc.
[3]AZ MA/LMA + DBDTP = dibutyl dithiophosphate, aziridineethyl methacrylate/lauryl methacrylate copolymer (mole ratio of 1:19 which contains 2 moles of dibutyl dithiophosphate).
[4]AZ MA/LMA + DDOPDTP = di(dioctylphenyl) dithiophosphate, aziridineethyl methacrylate/lauryl methacrylate copolymer (1:19 mole ratio which contains 2 moles of di(dioctylphenyl) dithiophosphate).

Obviously, many modifications and variations of the invention, as hereinabove set forth, can be made without departing from the spirit and scope thereof, and therefore only such limitations should be imposed as are indicated in the appended claims. For example, all of the copolymers described herein can be admixed either alone or in combination with each other and with the lubricating oil compositions herein to enhance the lubrication properties thereof.

We claim:

1. A lubricating oil composition which comprises a major amount of a lubricating oil and a minor amount, sufficient to improve the extreme pressure properties, of a dialkyl, diaryl, dialkaryl, diarylalkyl or diaryloxyalkyl dithiophosphorylated copolymer comprising the reaction product of (A) a monomeric aziridineethyl acrylate or methacrylate having the formula:

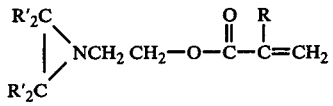

wherein R is selected from the group consisting of hydrogen and alkyl having from about 1 to about 6 carbon atoms; and each R' are either alike or different selected from hydrogen and lower alkyl groups of from about 1 to about 8 carbon atoms; and (B) a monomeric alkyl acrylate or methacrylate of the formula:

$$CH_2 = CR''COOR'''$$

wherein R'' is selected from the group of hydrogen and methyl, and R''' is selected from straight and branched chain alkyl groups containing from about 1 to about 30 carbon atoms; with the mole ratio of A to B being in the range of from about 1:99 to about 30:60; said copolymer comprising the formula:

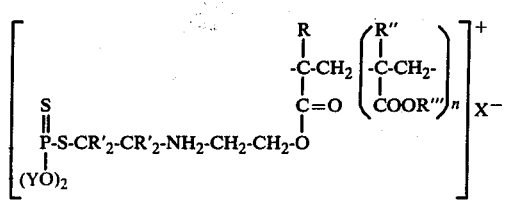

wherein R, R', R'' and R''' are as described above; and Y is alkyl, aryl, alkaryl, arylalkyl or aryloxyalkyl having from about 1 to about 30 carbon atoms; $X^-$ is

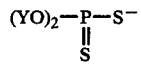

wherein Y is defined above; and wherein n is an integer of from about 1 to about 300; said copolymer having a molecular weight of at least about 20,000; and from about 0.1 weight percent to about 60 weight percent comprising the dialkyl, diaryl, dialkaryl, diarylalkyl or diaryloxyalkyl dithiophosphate moiety.

2. The lubricating oil composition of claim 1 wherein R is selected from the group consisting of hydrogen or alkyl having from about 1 to about 3 carbon atoms.

3. The lubricating oil composition of claim 1 wherein each R' is either alike or different selected from a lower alkyl group of from about 1 to about 4 carbon atoms.

4. The lubricating oil composition of claim 1 wherein R''' is selected from straight or branched chain alkyl groups containing from about 1 to about 20 carbon atoms.

5. The lubricating oil composition of claim 1 wherein the monomeric aziridineethyl acrylate is a member selected from the group consisting of 2-(1-aziridinyl) ethyl acrylate, 2-(2-methyl-1-aziridinyl) ethyl acrylate, 2-(2-dimethyl-1-aziridinyl) ethyl acrylate, 2-(2-ethyl-1-aziridinyl) ethyl acrylate, 2-(1-aziridinyl)-1-propyl acrylate, 2-(2,3-dimethyl-1-aziridinyl)-1-butyl acrylate, 2(2,2-dimethyl-1-aziridinyl)-1-butyl acrylate, 2(2,2-diethyl-1-aziridinyl)-1-ethyl acrylate, 2-(2-n-butyl-1-aziridinyl)-1-ethyl acrylate, 1-(2-methyl-3-ethyl-1-aziridinyl)-2-butyl acrylate or 1-(1-aziridinyl)-2-hexyl acrylate.

6. The lubricating oil composition of claim 1 wherein the monomeric aziridineethyl methacrylate is a member selected from the group consisting of 2-(1-aziridinyl)

ethyl methacrylate, 2-(2-methyl-1-aziridinyl) ethyl methacrylate, 2-(2-dimethyl-1-aziridinyl) ethyl methacrylate, 2-(2-ethyl-1-aziridinyl) ethyl methacrylate, 2-(1-aziridinyl)-1-propyl methacrylate, 2-(2,3-dimethyl-1-aziridinyl)-1-butyl methacrylate, 2(2,2-dimethyl-1-aziridinyl)-1-butyl methacrylate, 2-(2-n-butyl-1-aziridinyl)-1-ethyl methacrylate, 1-(2-methyl-3-ethyl-1-aziridinyl)-2-butyl methacrylate or 1-(1-aziridinyl)-2 hexyl methacrylate.

7. The lubricating oil composition of claim 1 wherein the monomeric alkyl acrylate is a member selected from the group consisting of methyl acrylate, ethyl acrylate, propyl acrylate, isopropyl acrylate, butyl acrylate, isobutyl acrylate, sec-butyl acrylate, t-butyl acrylate, 2-ethylhexyl acrylate, octyl acrylate, Oxo-octyl acrylate, isodecyl acrylate, undecyl acrylate, dodecyl acrylate, tridecyl acrylate, capryl acrylate, lauryl acrylate, myristyl acrylate, pentadecyl acrylate, palmityl acrylate or stearyl acrylate.

8. The lubricating oil composition of claim 1 wherein the monomeric alkyl methacrylate is a member selected from the group consisting of methyl methacrylate, ethyl methacrylate, propyl methacrylate, isopropyl methacrylate, butyl methacrylate, isobutyl methacrylate, sec-butyl methacrylate, t-butyl methacrylate, 2-ethylhexyl methacrylate, oxtyl methacrylate, Oxo-octyl methacrylate, isodecyl methacrylate, undecyl methacrylate, dodecyl methacrylate, tridecyl methacrylate, capryl methacrylate, lauryl methacrylate, myristyl methacrylate, pentadecyl methacrylate, palmityl methacrylate or stearyl methacrylate.

9. The lubricating oil composition of claim 1 wherein the ratio of the monomeric aziridineethyl acrylate or methacrylate to the monomeric alkyl acrylate or methacrylate is in the range of from about 1:99 to about 10:90.

10. The lubricating oil composition of claim 1 wherein the dialkyl, diarylalkyl or diaryloxyalkyl dithiophosphorylated moiety is a member selected from the group consisting of diisopropyl dithiophosphate, dibutyl dithiophosphate, di(2-ethylhexyl) dithiophosphate, di(Oxo-octyl) dithiophosphate, di(tridecyl) dithiophosphate, di(cyclohexyl) dithiophosphate, di(methylcyclohexyl) dithiophosphate, di(phenyl) dithiophosphate, di(cresyl) dithiophosphate, di(butylphenyl) dithiophosphate, bis(dioctylphenyl) dithiophosphate, bis(dinonylphenyl) dithiophosphate, bis(didecylphenyl) dithiophosphate, di(phenylethyl) dithiophosphate, di(phenylcarbinyl) dithiophosphate, di(cresoxyethyl) dithiophosphate, or di(cresoxypropyl) dithiophosphate.

11. The lubricating oil composition of claim 1 wherein the dialkyl, diaryl, dialkaryl, diarylalkyl or diaryloxyalkyl dithiophosphate moiety comprises from about 1.0 percent by weight to about 30 percent by weight of said copolymer.

12. The lubricating oil composition of claim 1 wherein n is an integer of from about 2 to about 99.

13. The lubricating oil composition of claim 1 wherein the copolymer has a molecular weight range of from about 20,000 to about 300,000.

14. The lubricating oil composition of claim 1 wherein the copolymer has a molecular weight range of from about 100,000 to about 300,000.

15. The lubricating oil composition of claim 1 wherein the copolymer has a molecular weight range of about 100,000 to about 200,000.

16. The lubricating oil composition of claim 1 wherein the copolymer comprises from about 0.1 percent by weight to about 10 percent by weight of said composition.

17. The lubricating oil composition of claim 1 wherein the copolymer comprises from about 0.5 percent by weight to about 5 percent by weight of said composition.

18. The lubricating oil composition of claim 1 wherein the lubricating oil is a member selected from the group consisting of mineral oil or synthetic oil and mixtures thereof.

* * * * *

UNITED STATES PATENT OFFICE
CERTIFICATE OF CORRECTION

Patent No. 4,136,042            Dated January 23, 1979

Inventor(s) John P. Pellegrini and Helen I. Thayer

It is certified that error appears in the above-identified patent and that said Letters Patent are hereby corrected as shown below:

Abstract, line 1, After "comprising" insert the following

--fuel oils, crude oils,--.

Col. 8, line 22, "hydrocarbonyl" should be --hydrocarbyl--.

Col. 12, line 44, "trademark" should be --tradename--.

Signed and Sealed this

Eighth Day of May 1979

[SEAL]

Attest:

RUTH C. MASON
Attesting Officer

DONALD W. BANNER
Commissioner of Patents and Trademarks